3,518,013
DENSITOMETER
Lloyd Clifford Sanford, Acton, and John A. O'Brien, Reading, Mass., assignors to Itek Corporation, Lexington, Mass., a corporation of Delaware
Filed Sept. 26, 1966, Ser. No. 582,065
Int. Cl. G01n 21/02, 21/22
U.S. Cl. 356—203     5 Claims

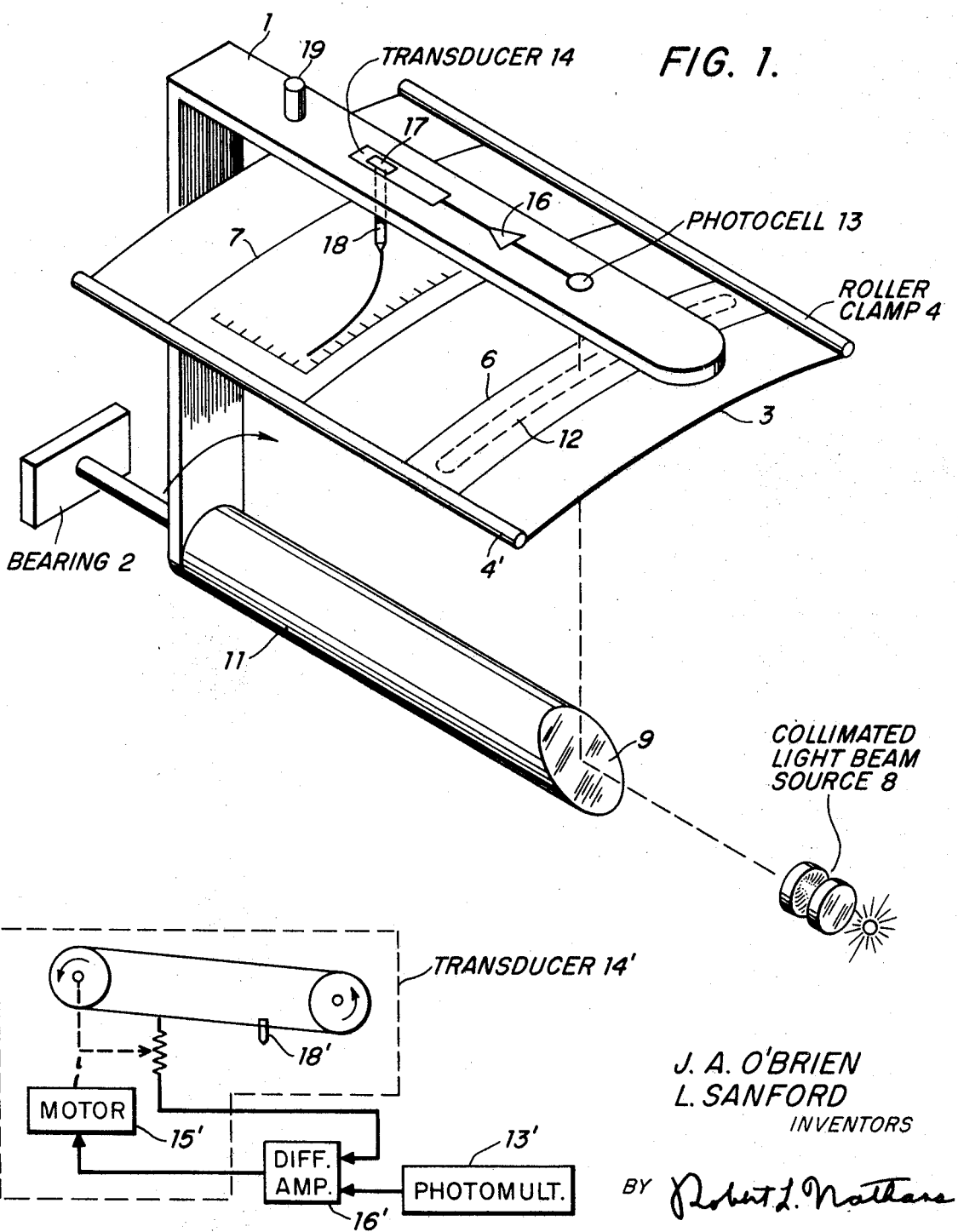

ABSTRACT OF THE DISCLOSURE

A recording densitometer to determine and plot the optical density of a strip of film. The strip of film and the associated graph paper are mounted side by side on a curved support platen. A pivotal arm is mounted above the platen with a photocell above the film strip and a recording arm above the graph paper. A pivotal mirror is mounted below the platen and is attached to the pivotal arm for rotational movement therewith. A collimated light source is directed against the mirror which redirects the light through the film strip onto the photocell. As the mirror and arm are rotated, the density of the film strip is detected by the output of the photocell which in turn controls the recording arm via a servo system to record the density of the film strip on the graph paper as a function of the length of the film strip.

---

This invention relates to densitometers.

As it is well-known to those skilled in the art, the response characteristics of a film strip are measured by exposing the film strip through an optical wedge which has a variable transmittance thereacross. The film is thereafter developed and the resulting gray scale density variations are measured. These density variations are then plotted against the log of the exposure required to produce these variations. The plotted data is called an H&D or D-Log-E curve and describes the photographic density of the particular film as a function of exposure. This process is often performed by manually reconstructing the graph point by point and where automation is employed relatively complex systems are utilized to convert the density variations into a plot. These systems are generally relatively bulky, expensive, and inaccurate.

Accordingly, it is the principal object of the present invention to provide a new and improved densitometer.

It is a further object of the present invention to provide a simple, inexpensive, and reliable densitometer which automatically and rapidly produces a "D-Log-E" curve directly and simultaneously as the photographic density is read and readily lends itself to portable operation.

Other objects and advantages will become obvious as the following description taken in conjunction with the drawing proceeds.

In accordacce with a preferred embodiment of the present invention a pivotable scanning arm is positioned over a curved support platen. A developed film strip having a gray scale thereon is clamped to the support member over a first portion thereof while graph paper is clamped over a second portion thereof. A beam of light of constant intensity impinges upon a mirror which pivots along with the pivotable arm so that the light beam will always strike an arm mounted photometer as the pivoted arm mechanically scans the developed wedge on the film strip. A transducer having a pen mounted on its armature is affixed to the pivotable arm over the graph paper. An amplifier is coupled between the photocell and the transducer to drive the pen to produce the varying Y displacements while the scanning arm sweeps in the X direction. Since the beam sweep means, the photomultiplier pickup and the output transducer are all mechanically affixed to the same movable member a simple, portable, accurate, and reliable recording densitometer may be fabricated.

FIG. 1 shows a schematic illustration of one embodiment of the densitometer.

FIG. 2 is a schematic diagram of one possible servo system which may be used to drive the recording transducer.

Referring now to FIG. 1, pivotable arm 1 is shown supported by bearing 2. The aforesaid film strip 6 having the gray scale developed thereon is mounted upon a first portion of curved support platen 3 while the graph paper 7 upon which the "D-Log-E" curve is to be recorded is mounted upon a second portion of platen 3, by means of roller clamps 4 and 4'. A light beam source 8 directs a narrow beam of light at mirror surface 9 which is mounted upon cylinder 11 rigidly affixed to pivotable arm 1. The beam of light reflected off of mirror 9 passes through an elongated slot or window 12 formed in support platen 3 and impinges upon photometer 13 which is mounted upon pivotable arm 1. This transducer may consist of a photomultiplier tube or any sensitive device which converts light intensity into a proportional electrical signal.

A preferred device comprises a photomultiplier tube circuit arranged to maintain the current therethrough constant regardless of light intensity variations (see Dumount Photomultiplier Tube Handbook, fourth edition, page 29). Accordingly the output signal will be proportional to the log of the input signal which will in turn control the Y position of the recording pen so that the Y coordinates of the graph will represent the log of the opacity of the gray scale. Alternatively a log amplifier may be utilized. The output circuit of transducer 13 is coupled to the input circuit of recording transducer 14 by virtue of amplifier 16. Transducer 14 may be a device such as shown in FIG. 2 or any other commercially available device for converting voltage or current into a proportional translational position of armature 17, which has a recording device such as a ball point pen 18 affixed thereto.

FIG. 2 discloses further details of one possible recording transducer arrangement. Photomultiplier 13 applies a control signal to differential amplifier 16, which causes the pulley motor 15 to rotate until the feedback voltage produced by the potentiometer equals the photomultiplier voltage. Thus this conventional servo loop causes recording pen 18 to assume a position proportional to the photomultiplier signal.

It should, therefore, be apparent that as arm 1 is manually displaced across curved platen 3 the film strip is scanned and the "D-Log-E" curve is automatically and directly recorded upon media 7 clamped to platen 3. A handle 19 may be provided to facilitate the mechanical scanning of arm 1. It is possible that the light beam source 8 may be physically affixed to rotational member 11 while it is also possible that amplifier 16 need not be mounted upon arm 1. Suitable electrical brushes would have to be provided to accommodate these modifications. Roller clamps 4 could be replaced by any other clamping devices which would cause the film strip and recording media to remain flush with the upper surface of support platen 3. Although the rotational mode is preferred to insure flush mounting of the graph paper and film strip a flat platen coacting with a strictly translational scanning device may be utilized within the spirit of the invention.

While there have been described what are at present considered to be the preferred embodiments of this invention, it will be obvious to those skilled in the art that various changes and modifications may be made therein without departing from the spirit of the invention.

What is claimed is:

1. A densitometer for determining the density of a given media comprising:
 (a) a fixed curved support platen having a first portion for supporting a media, the density of which is to be determined, and a second portion for supporting a recording media;
 (b) a rigid pivotal arm;
 (c) means for supporting said pivotal arm to enable said arm to travel in an arcuate path parallel to the surface of said support platen;
 (d) scanning means, including said pivotal arm, a radiation source to irradiate the media, and a radiation detector for detecting radiation transmitted through the media from said radiation source and for producing an electrical signal determinative of the density of the media as said pivotal arm travels in said arcuate path and scans the media;
 (e) recording means, including a recording transducer mounted upon said arm adjacent said second portion of said support platen, for making a continuous recording upon said recording media indicative of said electrical signal;
 (f) means for electrically coupling the output of said radiation detector to the input of said recording means, whereby as said media is scanned, the recording transducer simultaneously records the density of the media on said recording media;

2. Apparatus as set forth in claim 1 wherein said electrical coupling means feeds a logarithmic output signal to said recording means, thereby enabling said recording means to produce a D-log curve.

3. Apparatus as set forth in claim 2 wherein said electrical coupling means is mounted on said pivotal arm.

4. Apparatus as set forth in claim 1 wherein said scanning means optically passes a beam of light through the media and said first portion of said curved support platen includes an elongated window for allowing the beam of light to pass through said platen.

5. Apparatus as set forth in claim 1 wherein said recording transducer is a stylus and said recording media comprises graph paper.

References Cited

UNITED STATES PATENTS

| | | |
|---|---|---|
| 2,550,648 | 4/1951 | Sweet. |
| 3,026,764 | 3/1962 | Allen et al. |
| 3,035,771 | 5/1962 | Gerrard et al. _____ 235—184 |
| 3,241,432 | 3/1966 | Skeggs et al. |
| 3,270,348 | 8/1966 | Lesage et al. |
| 3,246,334 | 4/1966 | Devereaux. |
| 2,762,278 | 9/1956 | Sweet _____ 356—202 X |
| 2,972,925 | 2/1961 | Armbrecht et al. ___ 356—203 X |
| 3,023,664 | 3/1962 | Coleman et al. ____ 356—203 X |
| 3,096,137 | 7/1963 | Silard _____ 356—105 |

OTHER REFERENCES

"A Recording Physical Densitometer," C. Tuttle, The Photographic Journal, September 1936, pp. 495–504, vol. LXXVI, new series vol. LX.

Drenth et al.: "An Automatic Integrating Microdensitometer," J. Sci. Instrum., 42, April 1965, pp. 222-4.

White: "A Semiautomatic Analytical Recording Densitometer," J. SMPTE, 72, October 1963, pp. 798–803.

RONALD L. WIBERT, Primary Examiner

R. J. WEBSTER, Assistant Examiner

U.S. Cl. X.R.

250—218; 346—33; 356—223, 244